US008605552B1

(12) United States Patent
Bustamante et al.

(10) Patent No.: US 8,605,552 B1
(45) Date of Patent: *Dec. 10, 2013

(54) AUTONOMOUS WATERPROOF ELECTRONIC SIGNALING DEVICE

(75) Inventors: Michael John Bustamante, Southlake, TX (US); Brian A. Amond, Southlake, TX (US); Anthony M. Scott, Southlake, TX (US); Paul W. Fulbright, Richardson, TX (US)

(73) Assignee: Scuba Sonics Incorporated, Southlake, TX (US)

( * ) Notice: Subject to any disclaimer, the term of this patent is extended or adjusted under 35 U.S.C. 154(b) by 276 days.

This patent is subject to a terminal disclaimer.

(21) Appl. No.: 13/008,717

(22) Filed: Jan. 18, 2011

Related U.S. Application Data

(63) Continuation-in-part of application No. 11/010,780, filed on Dec. 13, 2004, now Pat. No. 7,872,946.

(60) Provisional application No. 60/528,677, filed on Dec. 11, 2003.

(51) Int. Cl.
*H04B 11/00* (2006.01)

(52) U.S. Cl.
USPC .......................... 367/134; 367/142; 367/151

(58) Field of Classification Search
USPC .......................... 367/134, 151, 142
See application file for complete search history.

(56) References Cited

U.S. PATENT DOCUMENTS

| 3,351,901 | A | * | 11/1967 | Padberg, Jr. | 367/116 |
| 3,620,326 | A | * | 11/1971 | Hogge | 181/176 |
| 4,305,143 | A | * | 12/1981 | Simms et al. | 367/134 |
| 4,604,737 | A | * | 8/1986 | Hoffman | 367/134 |
| 4,823,384 | A | * | 4/1989 | Lindsay | 379/441 |
| 4,999,606 | A | * | 3/1991 | Comerford et al. | 340/525 |
| 5,010,529 | A | * | 4/1991 | Maynus | 367/137 |
| 5,185,549 | A | * | 2/1993 | Sullivan | 310/334 |
| 5,726,396 | A | * | 3/1998 | Erath | 181/152 |
| 7,872,946 | B1 | * | 1/2011 | Bustamante et al. | 367/134 |
| 2002/0176323 | A1 | * | 11/2002 | Magine et al. | 367/134 |
| 2007/0076527 | A1 | * | 4/2007 | Romano | 367/134 |

* cited by examiner

*Primary Examiner* — Daniel Pihulic
(74) *Attorney, Agent, or Firm* — Handley Law Firm, PLLC

(57) ABSTRACT

The autonomous waterproof electronic signaling device disclosed comprises an activator; an audible signal emitter and a visual signal emitter, the audible signal emitter to emit a primary signal upon activation of the activator, the audible signal emitter comprising one or more of the following: a hydrophone, a siren, a speaker, or a transducer; and a head assembly, the head assembly positioned so as to alter at least a portion of the primary signal producing a notification signal. The visual signal emitter comprises at least one of incandescent bulbs, compact fluorescent bulbs, strobe bulbs, high intensity discharge (HID) bulbs, and light emitting diodes (LED) bulbs. The audible signal emitter and a visual signal emitter are operative singly or in combination, continuously or intermittently.

9 Claims, 15 Drawing Sheets

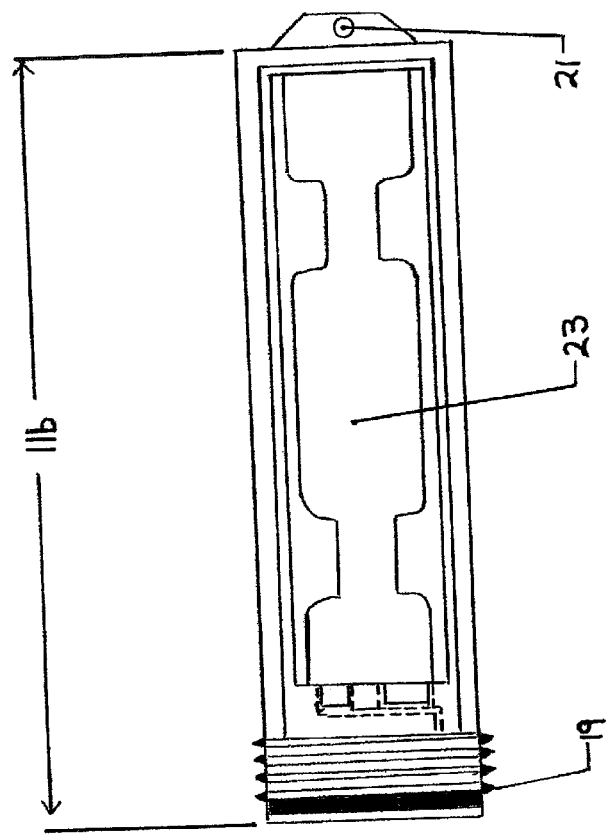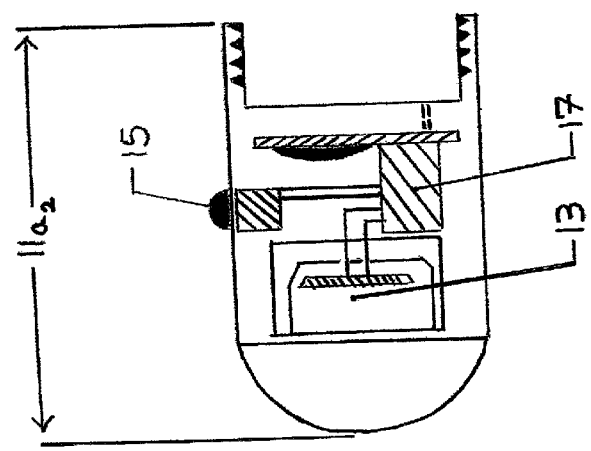
Fig. 2

US 8,605,552 B1

AUTONOMOUS WATERPROOF ELECTRONIC SIGNALING DEVICE

CROSS-REFERENCE TO RELATED APPLICATIONS

This application is a continuation-in-part application of prior application Ser. No. 11/010,780, filed Dec. 13, 2004, now U.S. Pat. No. 7,872,946, issued on Jan. 18, 2011, which claims the benefit of U.S. Provisional Application No. 60/528,677, filed Dec. 11, 2003 all of which applications are hereby incorporated herein by reference, in their entirety.

TECHNICAL FIELD

The invention relates generally to underwater signaling devices and, more particularly, to underwater signaling devices used by scuba divers, snorkelers, and other water-sports enthusiasts to obtain the attention of others underwater.

BACKGROUND

In general, communications underwater are restricted because of visual limitations and auditory limitations. Typical visual and auditory ranges are limited to a few yards. Current state of the art has not been able to exceed these limitations.

Underwater signaling devices have been used in scuba diving for years. Some underwater signaling devices use air from the scuba tank which produces an audible low-frequency horn-like sound. Others are designed to bang against the outside of the scuba tank which produces an audible low-frequency clanking-type sound. Still others have been designed to produce a low rattle-type or clicking sound with very limited range. Many of these devices are omni-directional, rather than being directionally oriented.

There is a key need for directive electronic signaling devices tailored for audible underwater communication. To understand this, it must first be understood that sensory limitations, specifically visual and auditory limitations, make the scuba diving experience a somewhat isolating one. For example, because of the visual limitations inherent in scuba diving, divers typically cannot gain the attention of their diving buddy, despite the fact that they are in close proximity to each other.

In addition, auditory limitations, specifically the inability of other divers to hear the human voice, even when a diver is screaming or yelling underwater just a few feet away, force divers to rely almost entirely upon their limited sense of sight, specifically line-of-sight, to attract the attention of their dive buddy, and this is a serious limitation even in good visibility situations. Current devices have limited auditory signal production capability, poor directional focus both in a latitudinal and a longitudinal scope and nominal range.

Furthermore, the limitations of existing devices due to the fact that their function is dependent upon diving equipment (i.e., scuba tank, buoyancy compensation device (BCD) and regulator) makes them useless to all water-sports enthusiasts except scuba divers. This integration requirement introduces the potential for equipment failure and damage, as well as (in the case of pneumatic devices) the accelerated depletion of a diver's air supply, his/her most essential survival necessity.

It is to these underwater communication needs, and other circumstances in which the attention of others is desired, that the instant invention is directed.

SUMMARY

The invention disclosed herein provides a truly autonomous electronic signaling device producing a plethora of tones, both modulated and unmodulated, in the audible frequency range of 20 Hz to 20,000 Hz, through use of a specially designed acoustic head.

The invention, referred to herein as an Autonomous Waterproof Electronic Signaling Device ("AWESD"), comprises an (a) momentary on/off switch; (b) a signal emitter, said signal emitter to emit a primary signal upon activation of said activator, said signal emitter comprising one or more of the following: a hydrophone, a siren, a speaker, or a transducer (such as may be found in an HSST multi-purpose assembly); and (c) a head assembly, said head assembly positioned so as to alter at least a portion of said primary signal producing a notification signal. In typical uses, as indicated above, the working signals are audible signals, and the head assembly an acoustic head assembly, so that the invention facilitates the proactive use (and, in many cases, the effective channeling) of sound underwater so as to enable the diver to rapidly and effectively signal those around him.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is a left side cutaway view of the invention in FIG. 1 with upper assembly 11a detached from lower assembly 11b.

FIG. 14A is an illustrative figure depicting an end view of the attachment of FIG. 14, taken along the line 14A-14A of FIG. 14.

FIG. 14B is an illustrative figure depicting an side view of the attachment of FIG. 14, taken along the line 14B-14B of FIG. 14.

DETAILED DESCRIPTION

As used herein, the following acronyms have the following meanings: (a) AWESD: Autonomous Waterproof Electronic Signaling Device; (b) HSST: Hydrophone, Siren, Speaker, Transducer Assembly; (c) BCD: Buoyancy Control Device; (d) SCUBA: Self-Contained Underwater Breathing Apparatus.

A key objective of the AWESD when activated is to produce a modulated audible tone detectable by the human ear underwater at distances up to fifty feet. This modulated tone will be produced through the use of a hydrophone, a siren, a speaker, or a transducer channeled through an acoustic head mounted on the waterproof body of the device.

A second key objective of the invention is to enhance the control the user exerts over the sound field. The acoustic head's unique physical attributes and specifications allow it to produce excellent control of the sound field in both the latitudinal direction (i.e., the directions normal/tangential to the longitudinal direction such as in the direction of the y- and z-orthogonal axes) and the longitudinal direction (i.e., the direction of the x-axis, which parallels the acoustic axis) with reference to the acoustic axis.

With reference to FIGS. 8 through 13, the various acoustic heads and their respective divergences from the acoustic axis are illustrated qualitatively for comparison purposes. This divergence from the acoustic axis is believed to be a function of velocity, radius of the transducer, and the frequency of the sound produced.

Figure 8:
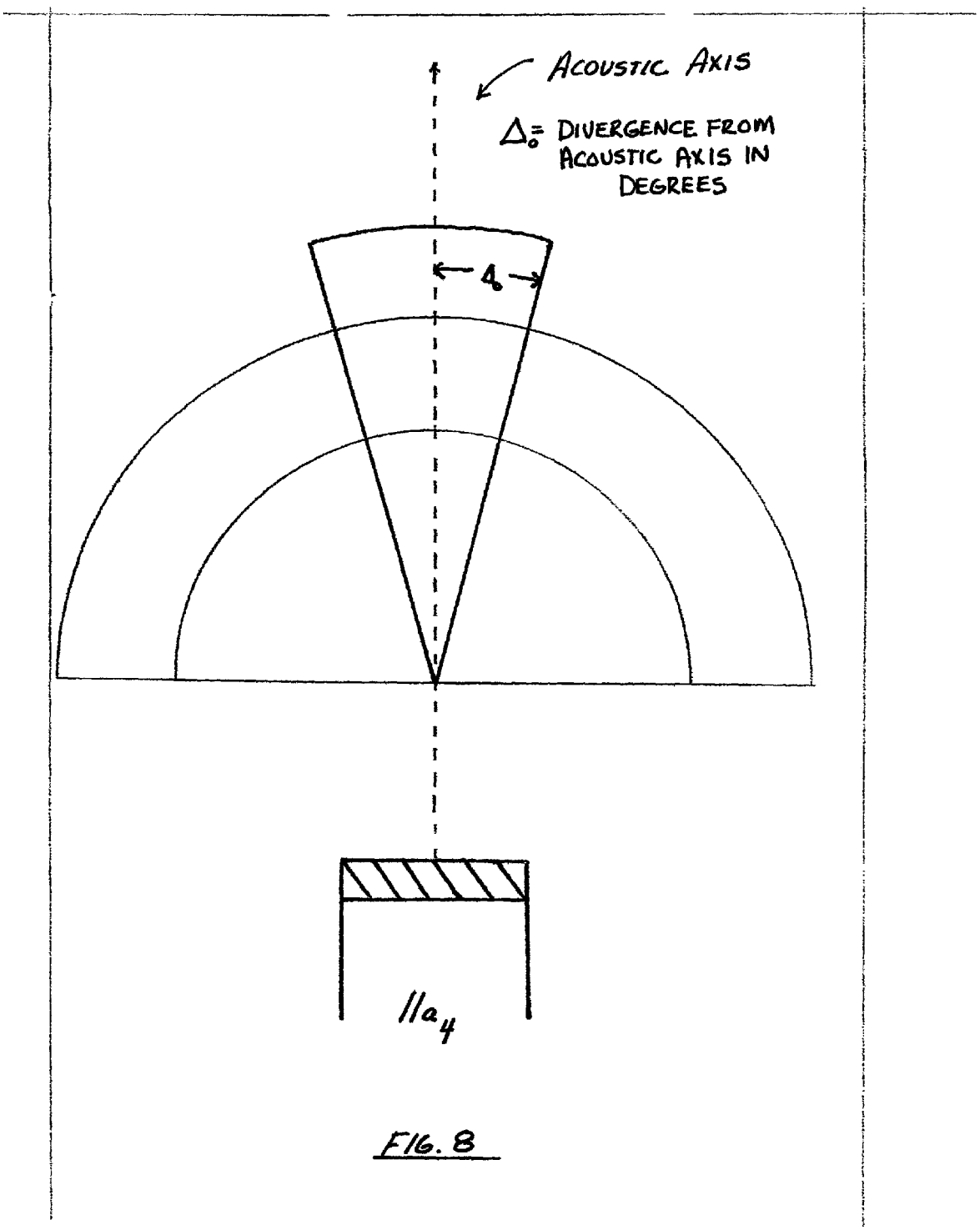
FIG. 8 is an illustrative figure depicting the characteristics of the sound field that would result from use of an acoustic head assembly such as that shown in FIG. 4.
Figure 9:
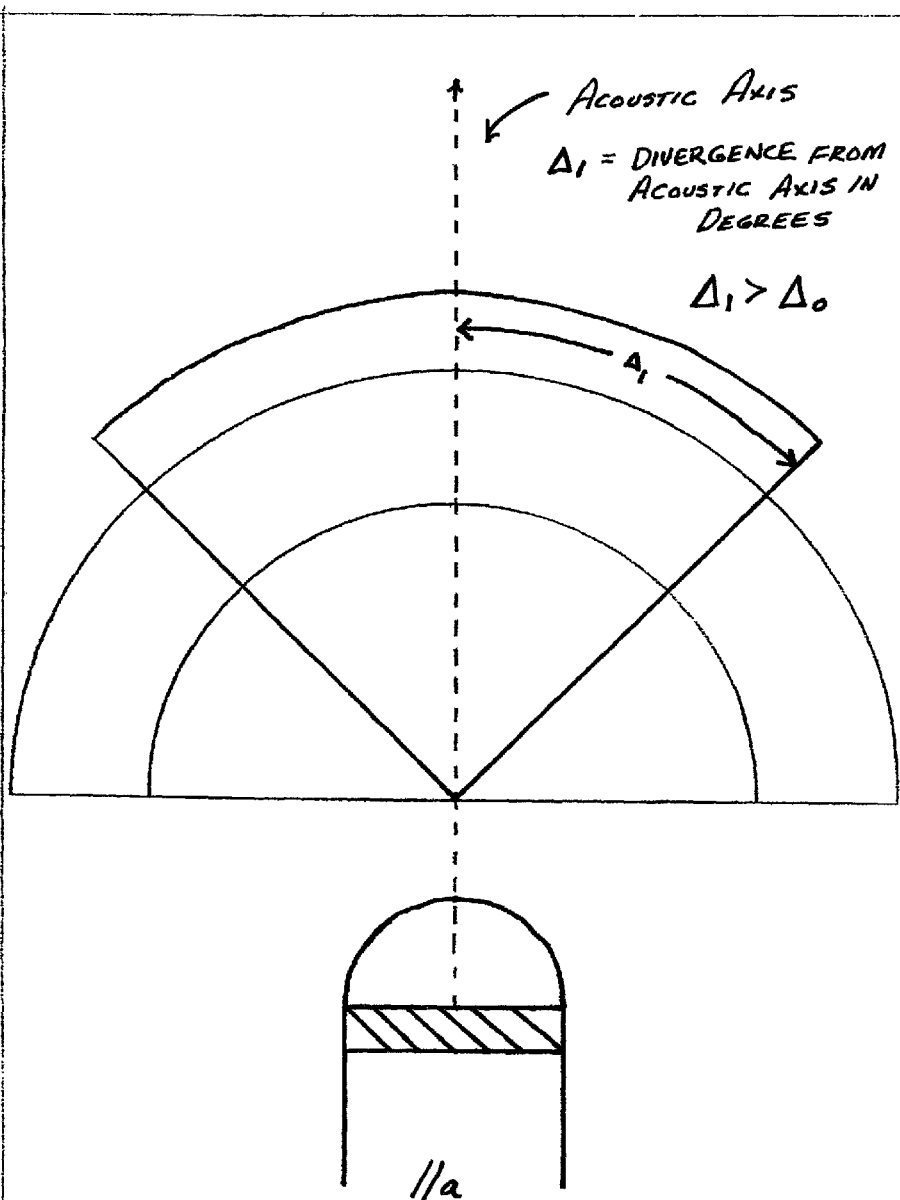
FIG. 9 is an illustrative figure depicting the characteristics of the sound field that would result from use of an acoustic head assembly such as that shown in FIG. 1, FIG. 2, or FIG. 6.
Figure 10:
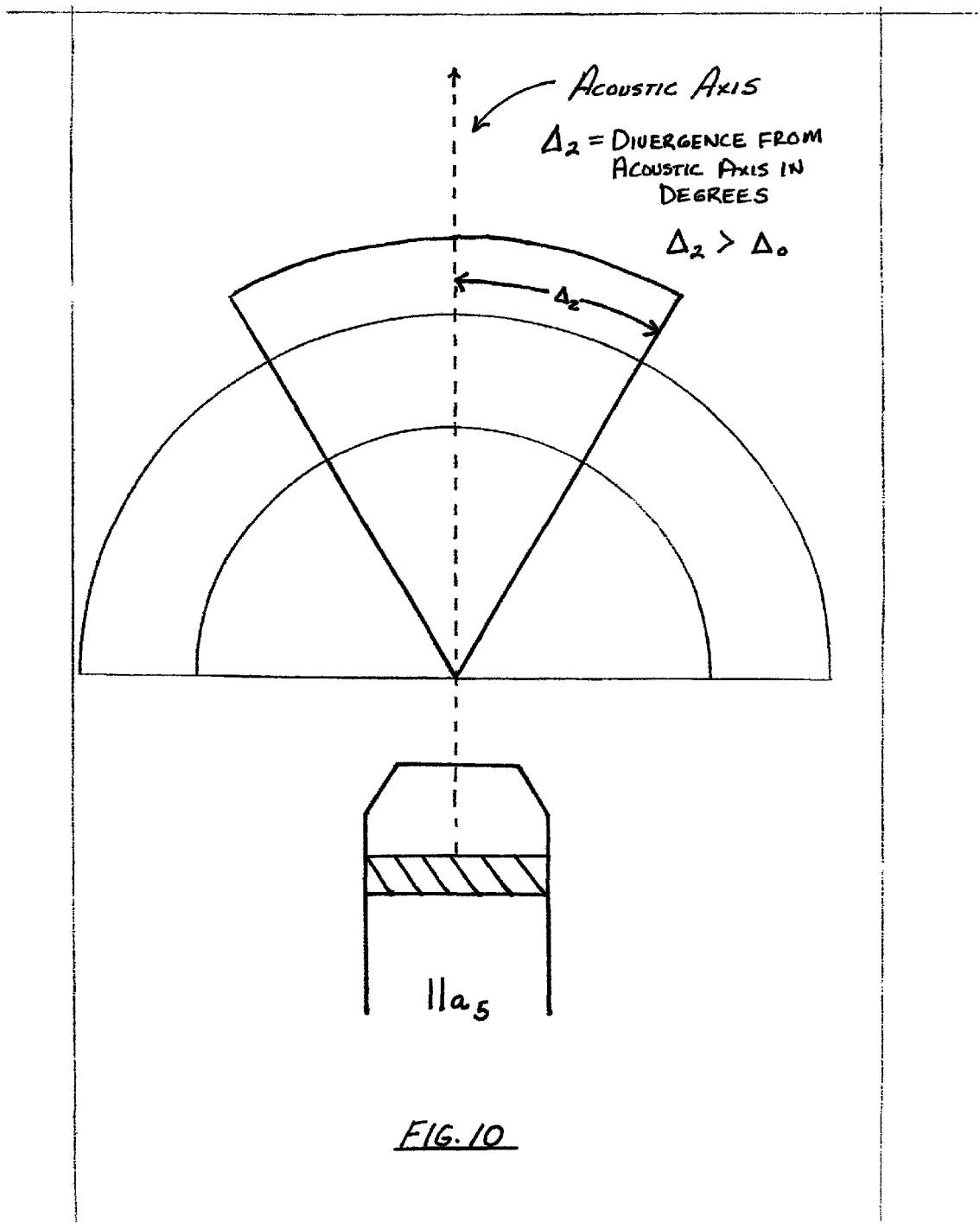
FIG. 10 is an illustrative figure depicting the characteristics of the sound field that would result from use of an acoustic head assembly such as that shown in FIG. 5.
Figure 11:
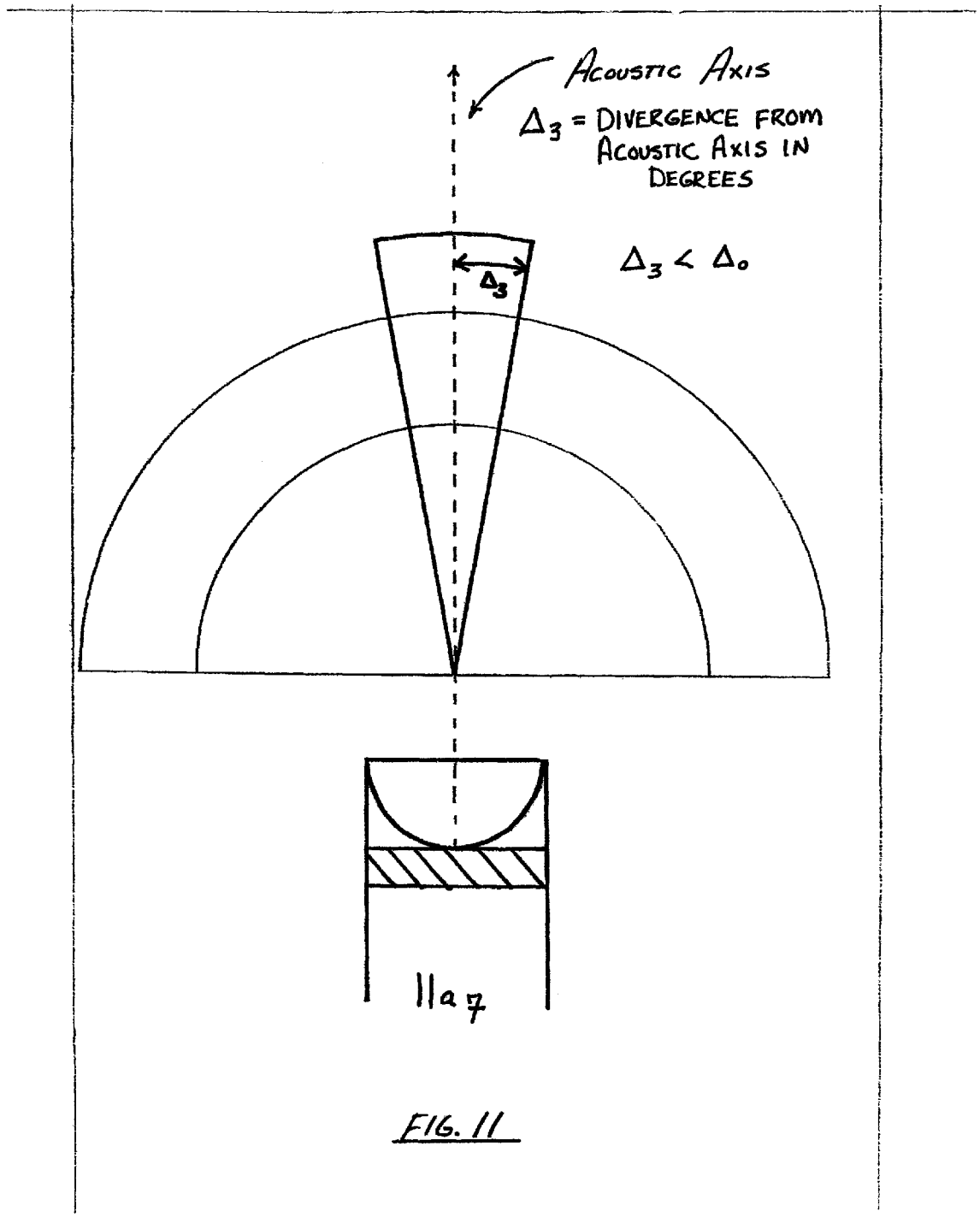
FIG. 11 is an illustrative figure depicting the characteristics of the sound field that would result from use of an acoustic head assembly such as that shown in FIG. 7.
Figure 12:
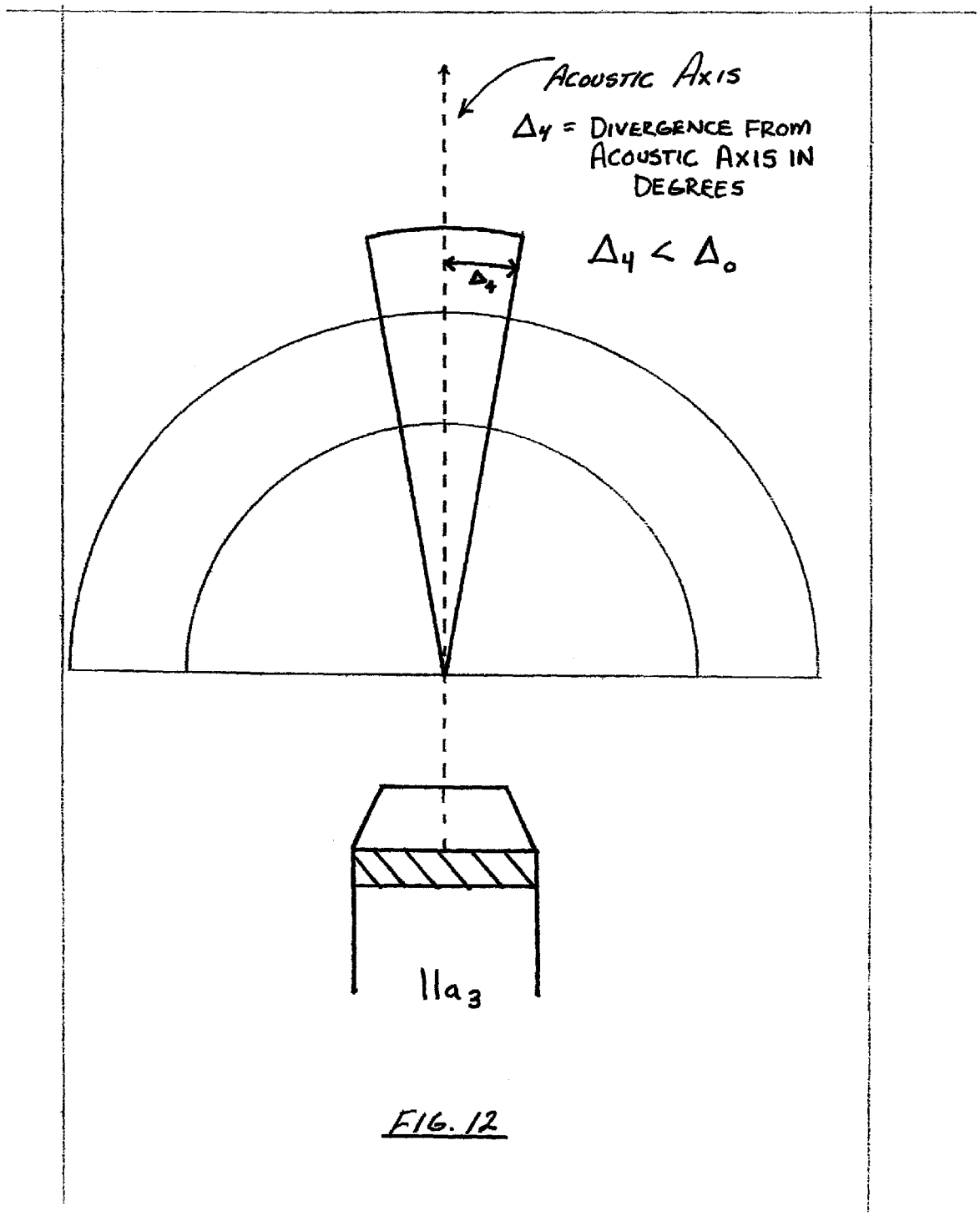
FIG. 12 is an illustrative figure depicting the characteristics of the sound field that would result from use of an acoustic head assembly such as that shown in FIG. 3.

FIG. 8 represents the divergence for the sound field produced by a round transducer located at the end of a right circular cylinder, which defines a reference value, $\Delta_0$. FIGS. 9 and 10 depict acoustic heads 11$a$ and 11$a_5$ respectively, both of which have a divergence greater than $\Delta_0$ FIGS. 11 and 12 depict acoustic heads 11$a_7$ and 11$a_3$, respectively, both of which have a divergence less than $\Delta_0$.

A third key objective of the invention is to protect and extend the effective range of the audible signal. The increased control of the audible signal imparted by the invention increases the effective range of the signal, making it effective for attracting attention at greater distances.

A fourth key objective of the invention is to increase its utility in attracting the attention of other divers underwater. The modulated nature of the signal makes it easily distinguishable from the background noise found underwater. It differs from this background noise in two ways: (a) it operates over a frequency range, oscillating between the high and low extremes of the range which helps to distinguish it from the predominately monotone nature of the background noise: and (b) it operates at a higher frequency than the background noise underwater which also helps it to stand out. Low frequencies travel better than high frequencies underwater, and therefore the background noise will be dominated by lower frequencies, making the higher frequency of the AWESD easier to differentiate and recognize. This modulated tone will be very recognizable and will gain the attention of others in close proximity (fifty feet).

A fifth key objective of the invention is to further enhance the functionality of the AWESD by means of an "adjustable divergence attachment" 25 which can be slipped over any of the acoustic heads to facilitate the additional and adjustable focusing of the audible sound along the acoustic centerline.

A sixth key objective of the AWESD is its ability to function independently. The AWESD, unlike the majority of signaling devices used underwater, is capable of functioning autonomously to produce its audible acoustic signal. Its performance is not contingent upon the performance of, or a drain upon the resources of, any other diver system or subsystem.

Devices such as pneumatic signaling units are installed in-line with (and are therefore dependent on) a scuba diver's air supply and in conjunction with the inflation device for their BCD. The drawbacks to this arrangement are twofold. First, every time an individual wishes to signal with the pneumatic device, he or she is consuming their most valuable underwater resource: their breathable air supply. Secondly, the addition of another component into the air supply system increases the complexity of the system and therefore the number of places where malfunctions or leaks can occur.

Devices including tank bangers and the ad hoc use of dive knives to bang against the scuba diver's air tank obviously rely on the air tank to produce their sound and therefore will not function without the tank. In addition to their inability to function independently, the repeated force associated with the impact necessary to produce the noise can potentially damage both a tank and it's exterior coating.

A seventh key objective of the AWESD is its ability to facilitate a signal recipient's attempts to locate the origin of the notification signal. As indicated, the AWESD is particularly effective in effectuating communication between divers underwater by means of an auditory signal. Furthermore, when another diver hears the invention's notification signal, and he scans his visual horizon in an effort to locate the origin of the signal, he is aided in his efforts by a visual cue emanating from the invention. This facilitates the rapid establishment of a rapport between two or more divers and enables them to more effectively manage another important underwater asset: time.

Figure 1:
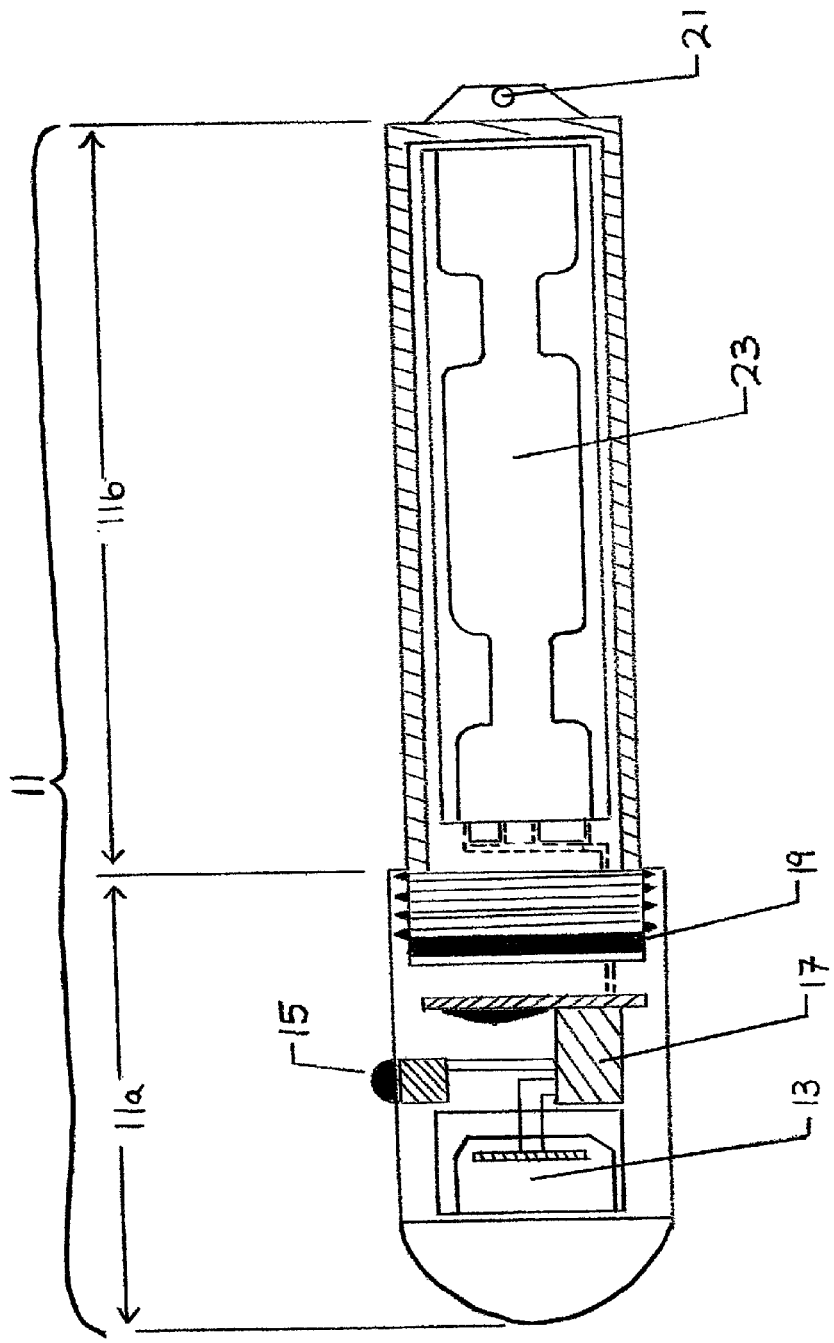
FIG. 1 is a left side cutaway view of the present invention.

With reference now to the drawings, and in particular with reference to FIG. 1, a preferred embodiment of the AWESD 11 of the present invention is illustrated. Reference to this figure, as well as FIG. 2 (which depicts the invention's separate assemblies), reveals that the invention comprises an upper assembly 11$a$ and a lower assembly 11$b$. Upper assembly 11$a$ in FIG. 1 is identical to upper assembly 11$a_2$ in FIG. 2.

As is evident in FIG. 1, typically, AWESD 11 has a water tight body length of approximately 6 to 7 inches and approximately 1 to 2 inches in width and approximately 1 to 2 inches in depth. Device 11 is preferably manufactured of high grade plastic resin or compound or other appropriate material.

Upper assembly 11$a$ is composed of clear translucent material such as polycarbonate, acrylic, or other translucent material, or any suitable material including but not limited to plastic resins or compounds. This upper assembly 11$a$ is sealed and/or molded to the lower assembly 11$b$ to create a watertight body 11. Upper assembly 11$a$ is hollow inside to allow the mounting of HSST assembly 13, which comprises one or more of the following: a hydrophone, siren, speaker, and/or transducer.

HSST assembly 13 is connected to HSST electronics package 17 which comprises all necessary electrical components needed for the proper functioning of the HSST assembly, including but not limited to a timing circuit, wires, leads and connectors, grounding capability, electrical components such as resistors, capacitors, diodes, transistors, piezoelectric crystals, coils, amplifiers, and computer chips. These components are arranged in a circuit to produce the oscillating sound in the preferred frequency range.

The human ear is capable of detecting sounds in the frequency range of approximately 20 Hz to 20,000 Hz. This range of human hearing capability is applicable in air or under water. Although a transducer emitting a monotone sound can be effective, generally speaking, a transducer that produces a sound which is comprised of an oscillating signal, be it oscillating between two, three, or four or more, different tones is generally more effective as a communication/signaling mechanism. Simply put, variation of the frequency of sound increases the effectiveness of the device at attracting the attention of another person, and is particularly effective under water.

Sound signals in the range of 1500 Hz to 6000 Hz are more easily discernable underwater than those in a broader range, and a signal, particularly an oscillating signal, in the narrower range of 2000 Hz to 4500 Hz has very desirable characteristics, and is extremely effective when used to gain the attention of another human being underwater.

Figure 13:
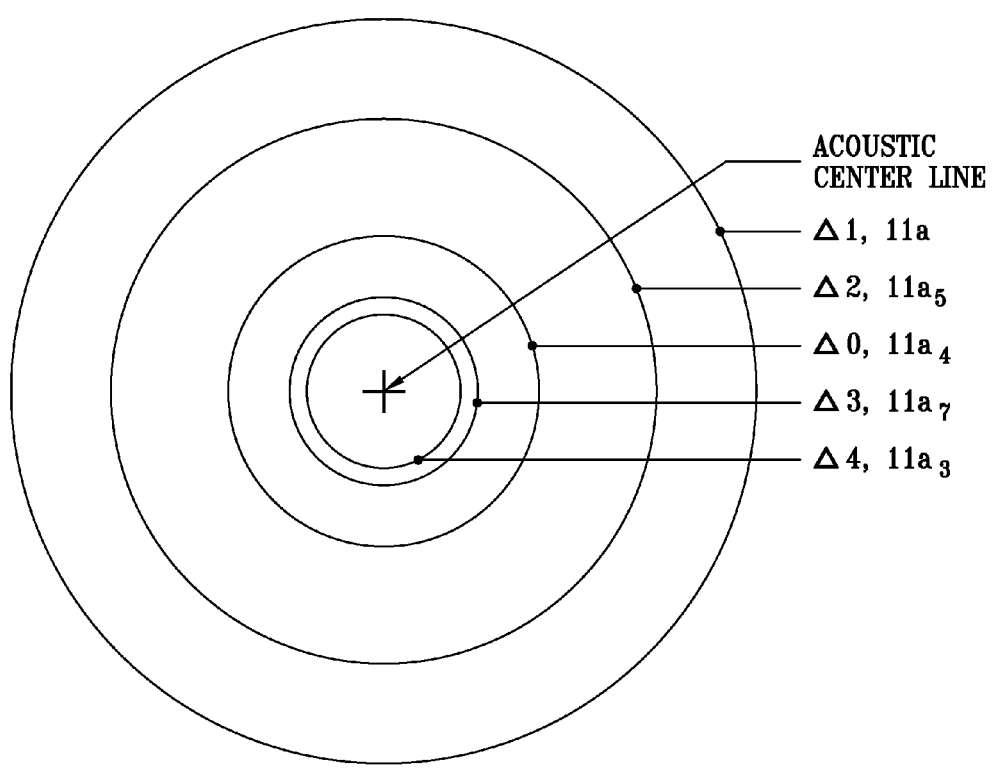
FIG. 13 is an illustrative figure depicting comparative characteristics of the sound fields referenced in FIGS. 8-12.

FIG. 9 provides illustrative guidance regarding the nature of the sound field that results from the use of the type of acoustic head shown in FIG. 1 and FIG. 2; FIG. 13 provides additional guidance regarding how this sound field differs from that generated by the other embodiments shown herein.

HSST electronics package 17 terminates in a pair of contacts to transfer power from the battery(ies) to the HSST electronics package.

Operation of the HSST assembly 13 and HSST electronics package 17 is controlled by activator 15. Activator 15 is a waterproof momentary switch sealed and/or molded to watertight body 11. The activator 15, HSST assembly 13, and HSST electronics package 17 may be configured to effectuate any desired on-off functionality (e.g., signal emitted only while actuator depressed; signal emitted constantly after actuation until actuator depressed again; signal emitted for a pre-determined period of time upon actuation). Upper assembly 11a is threaded at the open end with the threads on the inner surface of the assembly.

A water tight seal is made when joined with the lower assembly 11b, which has matching threads on the exterior. The watertight sealing of upper assembly 11a and lower assembly 11b is enhanced by the integration of gasket 19. Gasket 19 is comprised of rubber or any other flexible material suitable for ensuring a watertight seal.

Lower assembly 11b is preferably manufactured of high grade plastic resin or compound or other appropriate material. Lower assembly 11b features external threads on its open end and terminates in lanyard connection point 21 molded into the outside of the closed end. Lower assembly 11b is hollow inside to allow it to accommodate battery holder assembly 23. Battery holder assembly 23 is made of plastic resin or compound or other suitable material and comprises all necessary leads, connectors and contacts including but not limited to spring type contacts.

Figure 3:
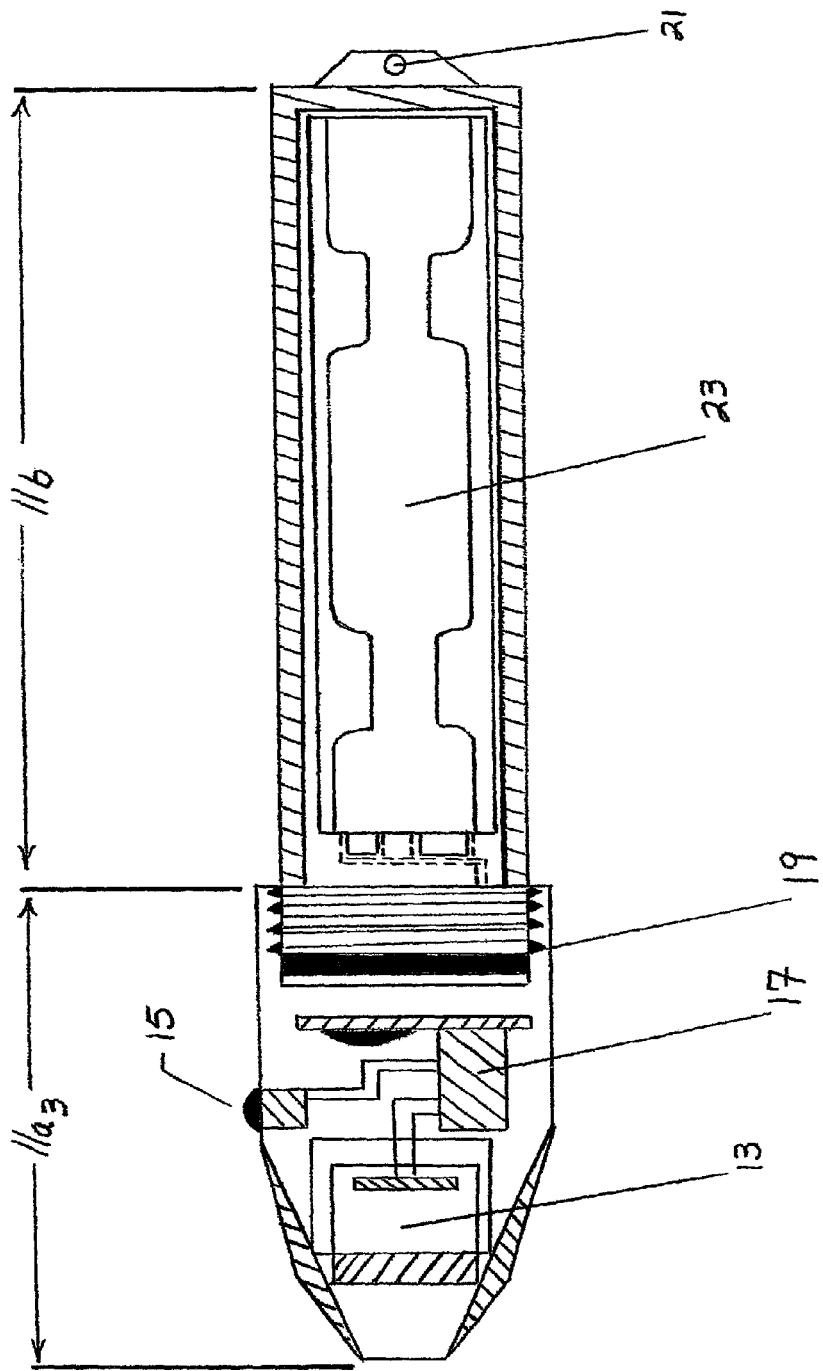
FIG. 3 is a left side cutaway view of the invention in FIG. 1 with an alternate upper assembly $11a_3$.

With reference to FIG. 3, the AWESD is the same as it appears in FIG. 1 with one exception. Upper assembly 11a has been shown in an alternate embodiment as upper assembly $11a_3$. Upper assembly $11a_3$ comprises a closed end whose curvature differs significantly from that of upper assembly 11a. This different curved surface is designed to give upper assembly $11a_3$ different acoustic properties from those of upper assembly 11a. FIG. 12 provides illustrative guidance regarding the nature of the sound field that results from the use of this type of acoustic head; FIG. 13 provides additional guidance regarding how this sound field differs from that generated by the other embodiments shown herein.

Figure 4:
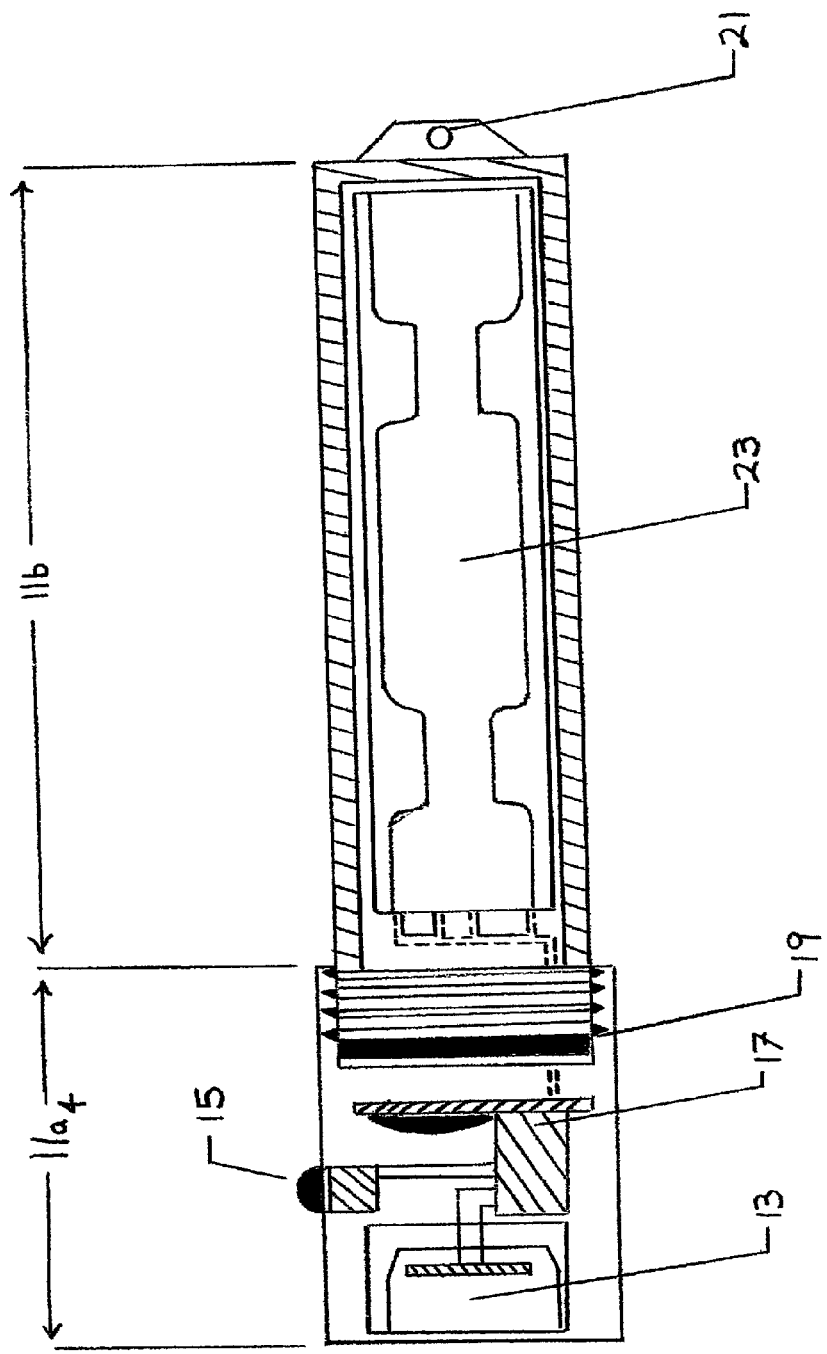
FIG. 4 is a left side cutaway view of the invention in FIG. 1 with an alternate upper assembly $11a_4$.

With reference to FIG. 4, the AWESD is the same as it appears in FIG. 1 with one exception. Upper assembly 11a has been shown in an alternate embodiment as upper assembly $11a_4$. Upper assembly $11a_4$ comprises a closed end without curvature which differs significantly from that of upper assembly 11a. This different surface is designed to give upper assembly $11a_4$ different acoustic properties from those of upper assembly 11a. FIG. 8 provides illustrative guidance regarding the nature of the sound field that results from the use of this type of acoustic head; FIG. 13 provides additional guidance regarding how this sound field differs from that generated by the other embodiments shown herein.

Figure 5:
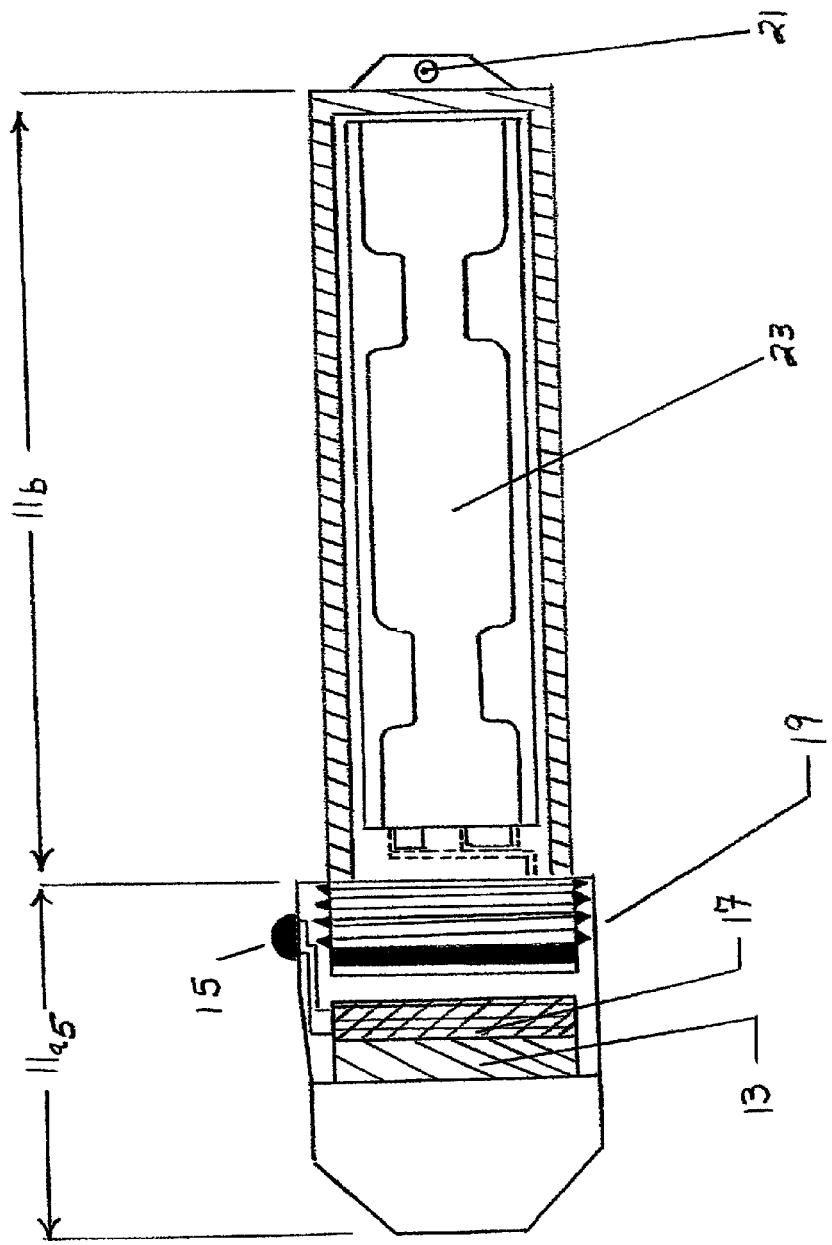
FIG. 5 is a left side cutaway view of the invention in FIG. 1 with an alternate upper assembly $11a_5$.

With reference to FIG. 5, the AWESD is the same as it appears in FIG. 1 with one exception. Upper assembly 11a has been shown in an alternate embodiment as upper assembly $11a_5$. Upper assembly $11a_5$ comprises a frustum of a right circular cone whose physical attributes differ significantly from that of upper assembly 11a. These different attributes are designed to give upper assembly $11a_5$ different acoustic properties from those of upper assembly 11a. FIG. 10 provides illustrative guidance regarding the nature of the sound field that results from the use of this type of acoustic head; FIG. 13 provides additional guidance regarding how this sound field differs from that generated by the other embodiments shown herein.

Figure 6:
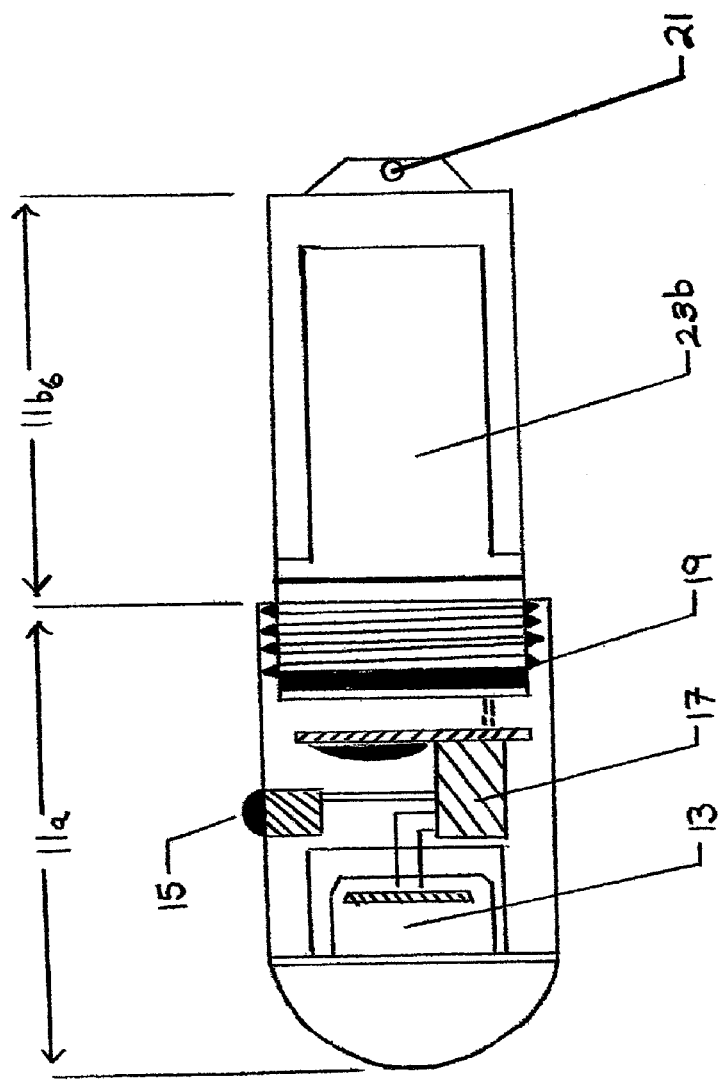
FIG. 6 is a left side cutaway view of the invention in FIG. 1 with an alternate lower assembly $11b_6$.

With reference to FIG. 6, the AWESD is the same as it appears in FIG. 1 with one exception. Lower assembly 11b has been shown in an alternate embodiment as lower assembly $11b_6$. Lower assembly $11b_6$ comprises a watertight body similar to lower assembly 11b, but being of a shorter length designed to allow the device to be powered by fewer and/or smaller batteries, contained in a smaller battery holder assembly 23b, thus making the AWESD a more compact unit. Since the acoustic head of upper assembly $11a_6$ is identical to the acoustic head of identical upper assembly 11a, then its sound field is identical to that generated by the invention as shown in FIG. 1 and FIG. 2. FIG. 9 provides illustrative guidance regarding the nature of the sound field that results from the use of this type of acoustic head; FIG. 13 provides additional guidance regarding how this sound field differs from that generated by the other embodiments shown herein.

Figure 7:
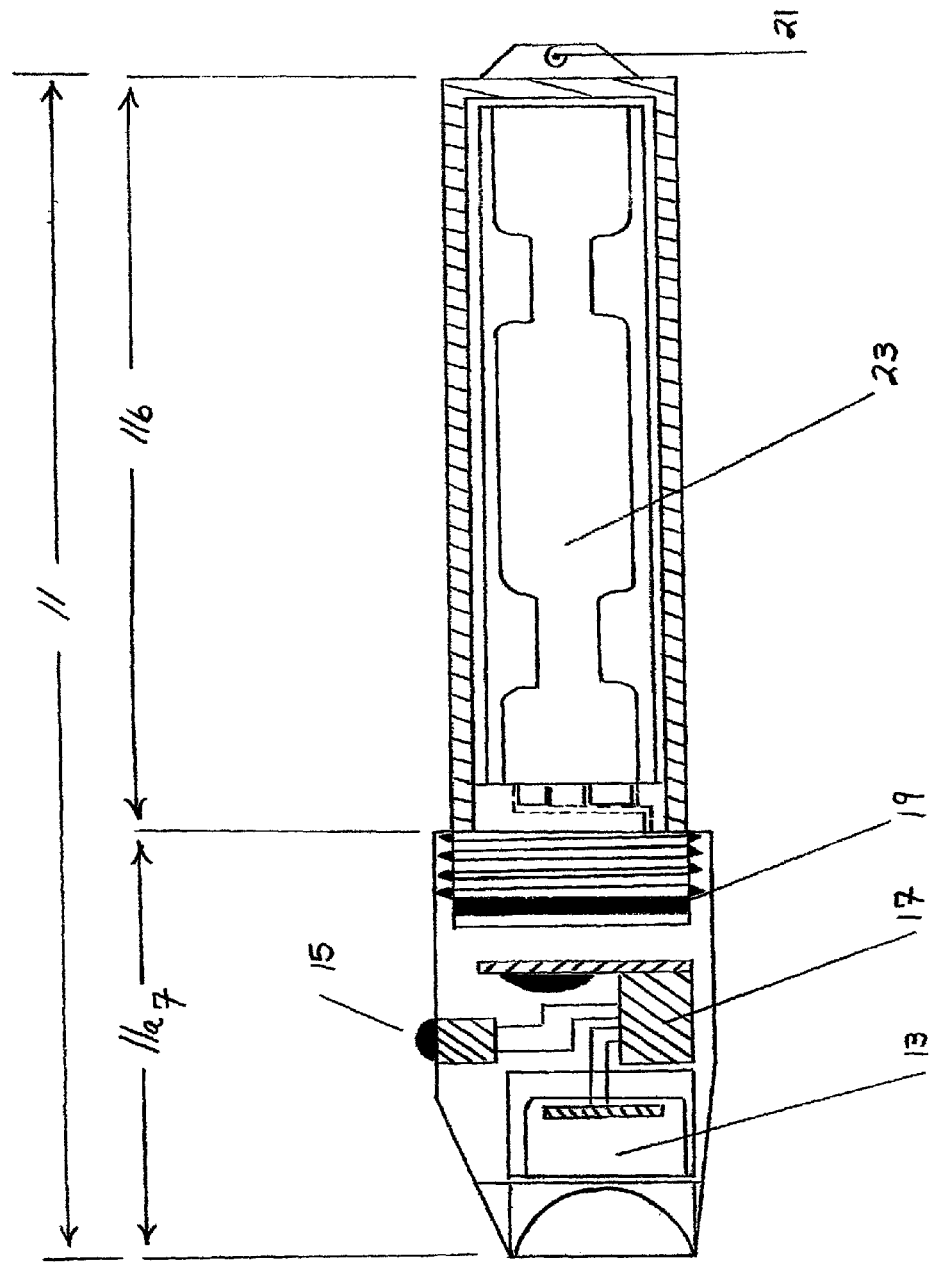
FIG. 7 is a left side cutaway view of the invention in FIG. 1 with an alternate upper assembly $11a_7$.

With reference to FIG. 7, the AWESD is the same as it appears in FIG. 1 with one exception. Upper assembly 11a has been shown in an alternate embodiment as upper assembly $11a_7$. Upper assembly $11a_7$ comprises a frustum of a right circular cone whose physical attributes differ significantly from that of upper assembly 11a. These different attributes are designed to give upper assembly $11a_7$ different acoustic properties from those of upper assembly 11a. FIG. 11 provides illustrative guidance regarding the nature of the sound field that results from the use of this type of acoustic head; FIG. 13 provides additional guidance regarding how this sound field differs from that generated by the other embodiments shown herein.

Figure 14:
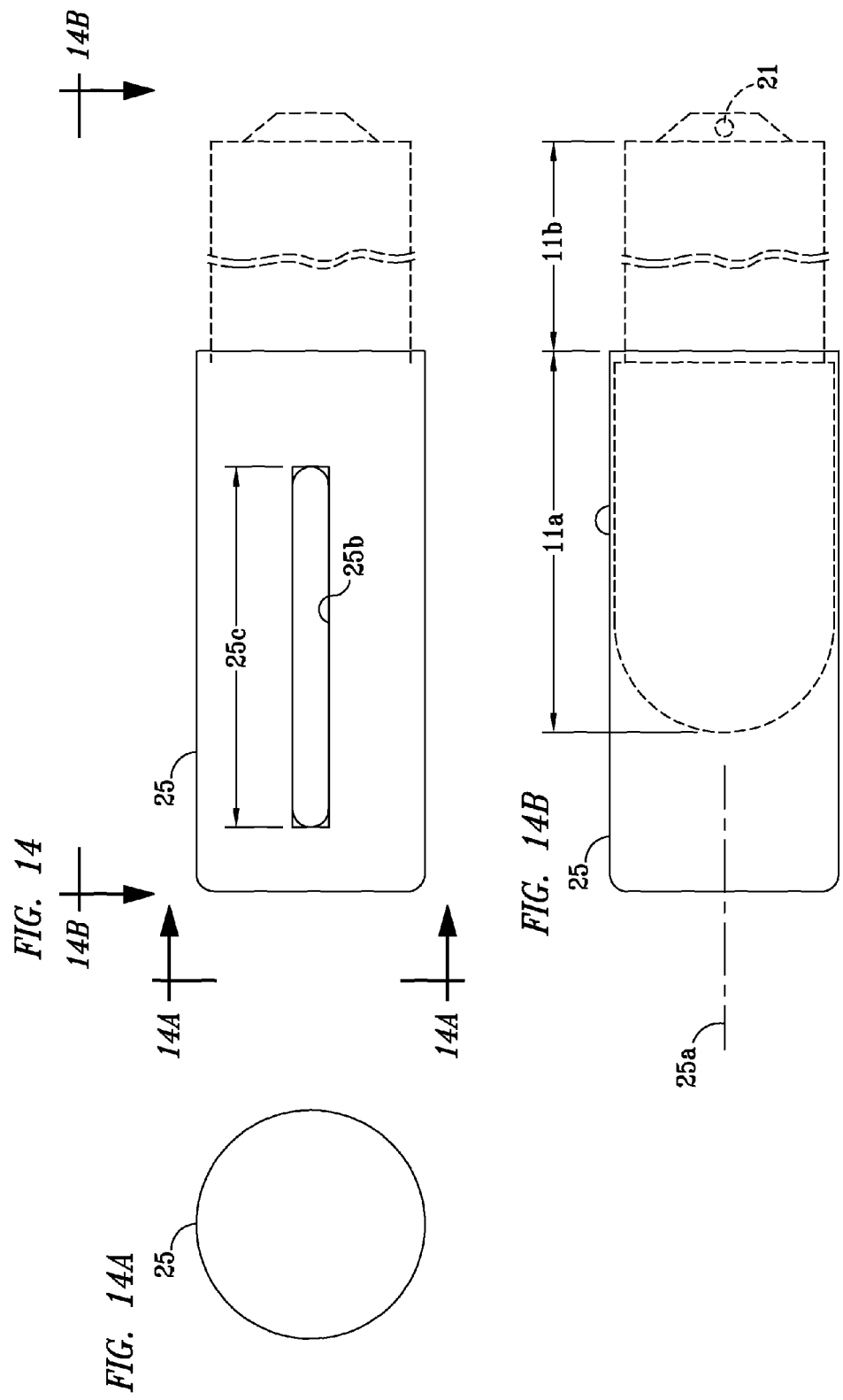
FIG. 14 is an illustrative figure depicting a top view of a design for an adjustable divergence attachment useful in conjunction with the invention embodiments described herein.

With reference to FIGS. 14, 14A, and 14B, an adjustable divergence attachment 25 is shown. The adjustable divergence attachment 25 is an essentially cylindrical member which fits closely and slidably about upper assembly 11a (and its corresponding counterparts, 11a3, 11a4, etc., in the other embodiments shown herein) so as to facilitate the adjustable manipulation of the sound field by the user. In brief, either before, during or after actuation of the invention, the adjustable divergence attachment 25 may be slidably re-positioned along the acoustic axis 25a of the invention, resulting in a modified divergence and sound field. This expands the signaling options available to the user of the invention. With reference to FIG. 14A, the surface of attachment 25 is preferably provided with a friction surface all around. With reference to FIG. 14B, the attachment 25 is preferably provided with a slide cut-out 25b having a slide length 25c.

Figure 15:
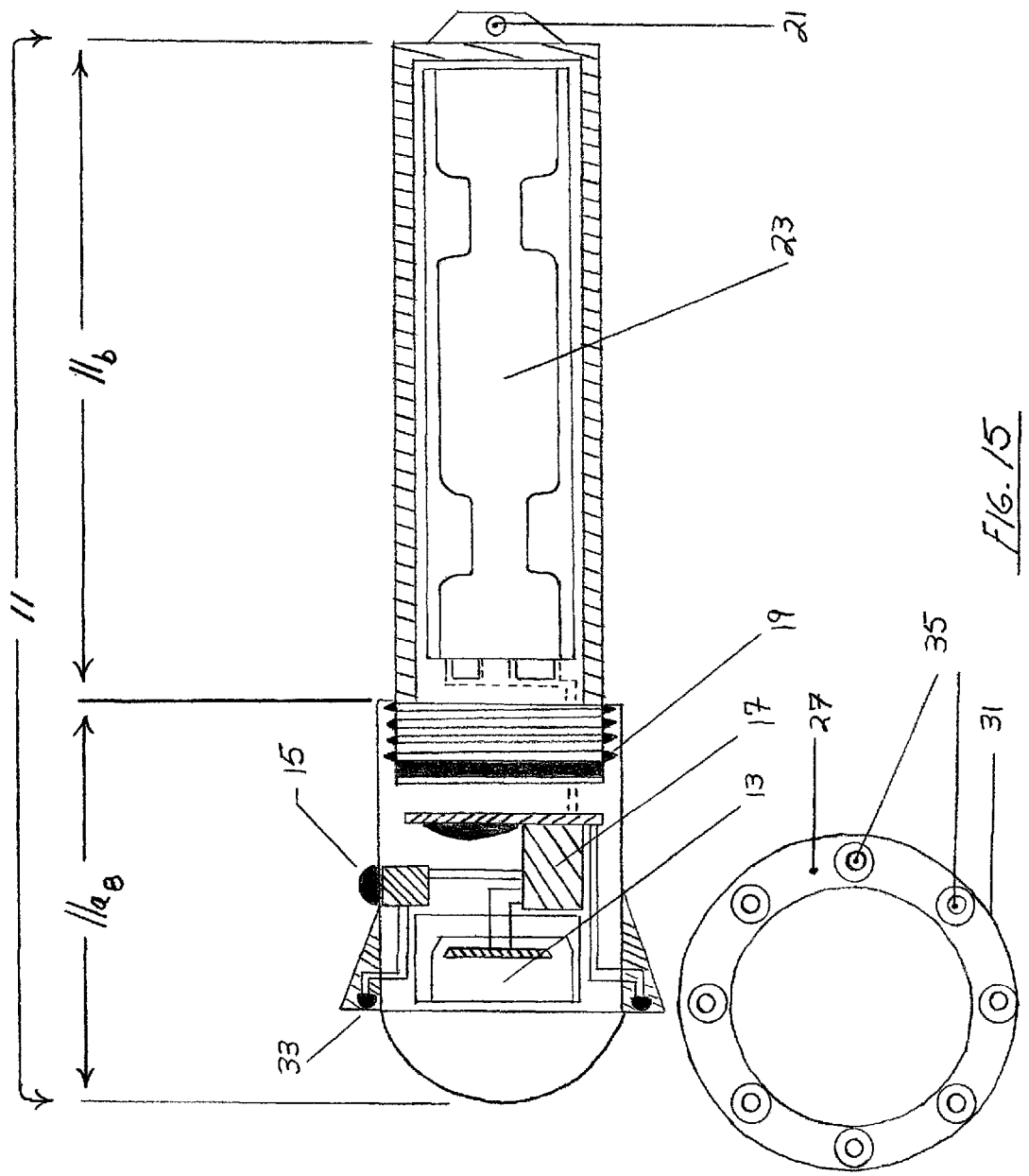
FIG. 15 is a left side cutaway view of the invention in FIG. 1 with an alternate upper assembly 11$a_8$ which facilitates the delivery of a visual signal.

With reference to FIG. 15, the AWESD is the same as it appears in FIG. 1 with one main exception. Upper assembly 11a has been shown in an alternate embodiment as upper assembly $11a_8$. Upper assembly $11a_8$ comprises one or more visual signal emitters, which function to deliver a visual signal to facilitate efforts by signal recipients to locate the source of the AWESD's main notification signal. The precise mechanisms by which the visual signal emitting functionality is implemented can be adjusted to the needs of different types of divers. Certainly, the invention circuitry can be configured so that, whenever the main notification signal is being generated, a supplementary visual signal is simultaneously emitted (perhaps in a monotone pattern or, alternatively, in a pattern which is similar to, or which contrasts with, the main notification signal). Alternatively, the invention circuitry could be configured so as to deliver intermittent visual cues, so as to conserve battery life. Finally, additional actuators, and accompanying circuitry, could be added to the invention so as to be able to actuate the main signal emitters and the visual signal emitter (s) completely independently.

In FIG. 15, the visual signal emitter is a concentric, or annular, illuminator which encircles the HSST assembly 13 and acoustic head. When the main notification signal is generated, a supplementary visual signal is simultaneously emitted. Although this is believed to be a particularly effective mechanism for visual notification, other equivalent embodiments are possible.

Illustrative Implementation

The following listing provides information relating to an illustrative implementation of the invention. The information provided does not represent the only mode of implementation; rather, it represents one embodiment of many of the invention elements, for which there may well be numerous equivalents.

11. Preferred Embodiment/Device body
   Plastic resin or compound or other appropriate material
   Hollow so as to contain all components
   Waterproof Impact resistant
   Slightly negative buoyant when completely assembled
11a. Upper Assembly (also $11a_2$, $11a_6$)
   Clear translucent material (polycarbonate, acrylic, etc.) or any plastic resin or compound or any other suitable material
   Closed at one end
   Threaded on interior at other end
   Unique physical attributes which enhance acoustic characteristics of device
$11a_3$. Upper Assembly—Alternate embodiment
   Clear translucent material (polycarbonate, acrylic, etc.) or any plastic resin or compound or any other suitable material
   Closed at one end
   Threaded on interior at other end
   Unique physical attributes which enhance acoustic characteristics of device
$11a_4$. Upper Assembly—Alternate embodiment
   Clear translucent material (polycarbonate, acrylic, etc.) or any plastic resin or compound or any other suitable material
   Closed at one end
   Threaded on interior at other end
   Unique physical attributes which enhance acoustic characteristics of device
$11a_5$. Upper Assembly—Alternate embodiment
   Clear translucent material (polycarbonate, acrylic, etc.) or any plastic resin or compound or any other suitable material
   Closed at one end
   Threaded on interior at other end
   Unique physical attributes which enhance acoustic characteristics of device
$11a_7$. Upper Assembly—Alternate embodiment
   Clear translucent material (polycarbonate, acrylic, etc.) or any plastic resin or compound or any other suitable material
   Closed at one end
   Threaded on interior at other end
   Unique physical attributes which enhance acoustic characteristics of device
$11a_8$. Upper Assembly—Alternate embodiment
   Clear translucent material (polycarbonate, acrylic etc.) or any plastic resin or compound or other appropriate material
   Closed at one end
   Threaded on interior at other end
   Unique physical attributes which enhance acoustic characteristics of device
   Unique physical features for added light or light bulbs to enhance notification or visual needs
11b. Lower Assembly
   Plastic resin or compound or other appropriate material
   Closed at one end
   Threaded on exterior to allow connection with 11a
   Unique physical attributes which enhance acoustic characteristics of device
$11b_6$. Lower Assembly—Alternate embodiment
   Plastic resin or compound or other appropriate material
   Closed at one end
   Threaded on exterior to allow connection with 11a
   Unique physical attributes which enhance acoustic characteristics of device
   Shorter in length to accommodate fewer and/or smaller batteries
13. Hydrophone, siren, speaker, or transducer (HSST)
   Able to send and/or receive audible and/or inaudible frequencies
   Covering the frequency range from 0.1 Hz To 2 MHz.
   Preferred frequency range of 1500 Hz to 6000 Hz.
   Operable over a wide temperature range, from 0° C. to 100° C.
   Transducers including but not limited to piezoelectric design
15. Activator
   Momentary switch
   Waterproof
17. HSST electronics package
   Timing circuit
   Wires, leads, connectors
   Grounding capability
   Electrical components including—resistors, coils, amplifiers, diodes, capacitors transistors, piezoelectric crystals and other essential components
   Connector for batteries
19. Gasket
   Rubber or other suitable material
   Aids in maintaining waterproof seal between 11a and 11b
21. Lanyard connection point
   Molded on the outside of 11a 23. Battery holder assembly
  Plastic resin or compound or other suitable material
  Leads, connectors, contacts
23b. Battery holder assembly
  Plastic resin or compound or other suitable material
  Leads, connectors, contacts
  Shorter in length to accommodate fewer and/or smaller batteries
25. Adjustable divergence attachment
  Plastic resin or compound or other suitable material
27. Reflector for light bulbs
  Plastic, metal, or other appropriate material or combination of materials
  Appropriate shape to enhance the pattern of the light waves emitted
29. Wire chase
  Wires and connectors
31. Mounting ring screw down
  Threaded to mount on exterior of 11a8
33. Lens
  Translucent material (polycarbonate, acrylic etc.) or other appropriate material
35. Light bulb
  LED, xenon bulb or any other suitable light source type
37. Activator switch for flashlight
  Two or three position switch
  On/off, momentary or a combination of the two Waterproof Refinements of Interest Additional experimentation has revealed that, although the use of a momentary on/off switch is desirable in a majority of the situations in which a switch is employed in the instant invention, desirable functionality is also achieved, wherever a momentary switch or other switch may be employed, through the use of a reed switch, a pneumatic switch, an external on/off switch, and/or a waterproof switch.

In addition, although it was originally believed that the sound waves generated by, the invention were detectable by the human ear at distances up to fifty feet, it has been discovered that sound waves generated by the invention and its various components and subassemblies are detectable by the human ear at distances up to fifty feet and beyond.

Furthermore, although it was recommended that various components be constructed of clear translucent materials, the reader of ordinary skill in the art will doubtless appreciate that opaque materials may readily be employed whenever translucence is not required by the application; conversely, whenever the invention features the use of a visual signal, and translucence of various component materials of construction is desired, then, of course, translucent materials should be employed. For example, if no visual signal is generated by a particular embodiment, then an opaque body may be employed; however, if a visual signal is incorporated into the embodiment, then, of course, a translucent body (or at least partially translucent body) is desired.

Refinements Utilizing Combinations of Multiple Light "Visual Signal Emitter" Types.

The use of "one or more" types or combinations of "visual signal emitters" invites the basis of a correspondence. That is, for example, it might be desirable to configure the invention so that the following distinct lighting combinations could be employed for various diving conditions.

Light Emitting Diode (LED) Bulbs and Incandescent Bulbs combined in the same embodiment. This application would work efficiently under changing ambient lighting conditions experienced while diving.
  Compact Fluorescent Bulbs and Strobe Bulbs combined in the same embodiment. This application would work efficiently under diving conditions requiring extended lighting periods and enhanced safety requirements.
  High Intensity Discharge (HID) Bulbs and LED Bulbs combined in the same embodiment. This application would work efficiently for diving conditions requiring lighting where the bulbs are required to have a long life and high lumens per watt.

In such a case, the invention as described herein is configured with multiple light bulbs of various types and color to fit the conditions referenced above. Thus, by way of example, but not limitation, a diver entering the water during daytime hours of 9 AM to 3 PM while ambient light is good, may engage the activator to turn on the incandescent bulb or incandescent bulbs to provide enhanced localized lighting. After 3 PM and as ambient lighting fades, the diver may engage the light emitting diode (LED) bulb or (LED) bulbs. LED bulbs provide excellent luminosity in lower ambient lighting environments. In addition the use of LED bulbs will save energy compared to other bulbs. Further, given additional alternative activator settings, the diver could engage both the incandescent and LED bulbs simultaneously to provide a wider spectrum of light and more total lumens. This use of both types of light simultaneously is particularly helpful when observing marine life, locating other divers, engaging in underwater photography or engaging in any activity where additional light is helpful.

The embodiment referenced above could also be configured in the following manner. Diving is a dynamic event, in respect to diving situations requiring higher levels of risk and higher levels of safety preparation, a diver or divers may desire a configuration utilizing an alternative lighting combination of fluorescent bulb(s) and strobe bulb(s). Given the conditions of risk and need for higher safety, fluorescent bulbs provide higher lumens per watt than that of LED or Incandescent bulbs. Strobe bulbs provide higher levels of candela and are visible at greater distances both in and out of water compared to other types of bulbs.

Still further, the flexibility of the system design referenced above reminds the reader that the visual signal emitters can be configured in a wide variety of ways. For example, when ever conditions require that the longevity of the visual signal emitters be maximized, High Intensity Discharge (HID) and LED lights could be employed. These types of lights (bulbs) have a longer life and can be configured to operate on low wattage and low voltage. Diving conditions requiring this type of configuration would include but not be limited to, cave diving, wreck diving, deep exploration and remote expedition diving.

Refinements Utilizing Multiple Sound (Audible Signal Admitter) and Multiple Light (Visual Signal Emitter) Settings.

The utility of the device makes it such that divers will desire the ability to access and or program different combinations of light and sound. This can be accomplished through the setup and programming of the previously defined HSST assembly 13 in conjunction with previously defined part number 37 (activator switch for flashlight) and/or the activator 15 which can be "configured to effectuate any desired on-off functionality". This would include, but not be limited to, upon activation:

A continuous visual emitter (light) with no audible signal. By way of example, but not limitation, the device could be used as a flashlight.
  A continuous or intermittent audible signal with the light off. By way of example, but not limitation, the device could be used as a signaling tool to get another diver's attention at close proximity, such as 20 to 30 feet underwater.

A continuous visual emitter (light) with continuous or intermittent audible signal. By way of example, but not limitation, the device could be used to get another diver's attention at distances 30 to 100 feet underwater.

A flashing visual emitter (light) with continuous or intermittent audible signal. By way of example, but not limitation, the device could be used as a safety device above or below the water surface.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A signaling device comprising:
a) an activator;
b) an audible signal emitter, said signal emitter to emit a primary aquatic signal comprising sound waves upon activation of said activator, said signal emitter comprising one or more of the following: a hydrophone, a siren, a speaker, or a transducer;
c) an acoustic head assembly, said acoustic head assembly positioned so as to alter at least a portion of said primary aquatic signal, producing a notification signal;
d) a visual signal emitter to emit a visual signal upon activation of said activator, said visual signal emitter comprises at least one of incandescent bulbs, compact fluorescent bulbs, strobe bulbs, high intensity discharge (HID) bulbs, and light emitting diodes (LED) bulbs;
e) wherein said acoustic head assembly alters a substantial portion of said sound waves or said primary aquatic signal; and
f) wherein said acoustic head assembly alters said substantial portion of said sound waves by means of an obtuse frusta-conical profile about which said substantial portion of said sound waves pass.

2. The signaling device of claim 1 wherein said visual signal features a non-random oscillating pattern similar to said substantial portion of said sound waves altered by said obtuse frusta-conical profile employed for said sound waves.

3. The signaling device of claim 1 configured to emit a continuous visual emitter (light) with no audible signal.

4. The signaling device of claim 1 configured to emit a continuous audible signal with the light off.

5. The signaling device of claim 1 configured to emit an intermittent audible signal with the light off.

6. The signaling device of claim 1 configured to emit a continuous visual emitter (light) with continuous audible signal.

7. The signaling device of claim 1 configured to emit a continuous visual emitter (light) intermittent audible signal.

8. The signaling device of claim 1 configured to emit a flashing visual emitter (light) with continuous audible signal.

9. The signaling device of claim 1 configured to emit a flashing visual emitter (light) with intermittent audible signal.

* * * * *